Figure 1:
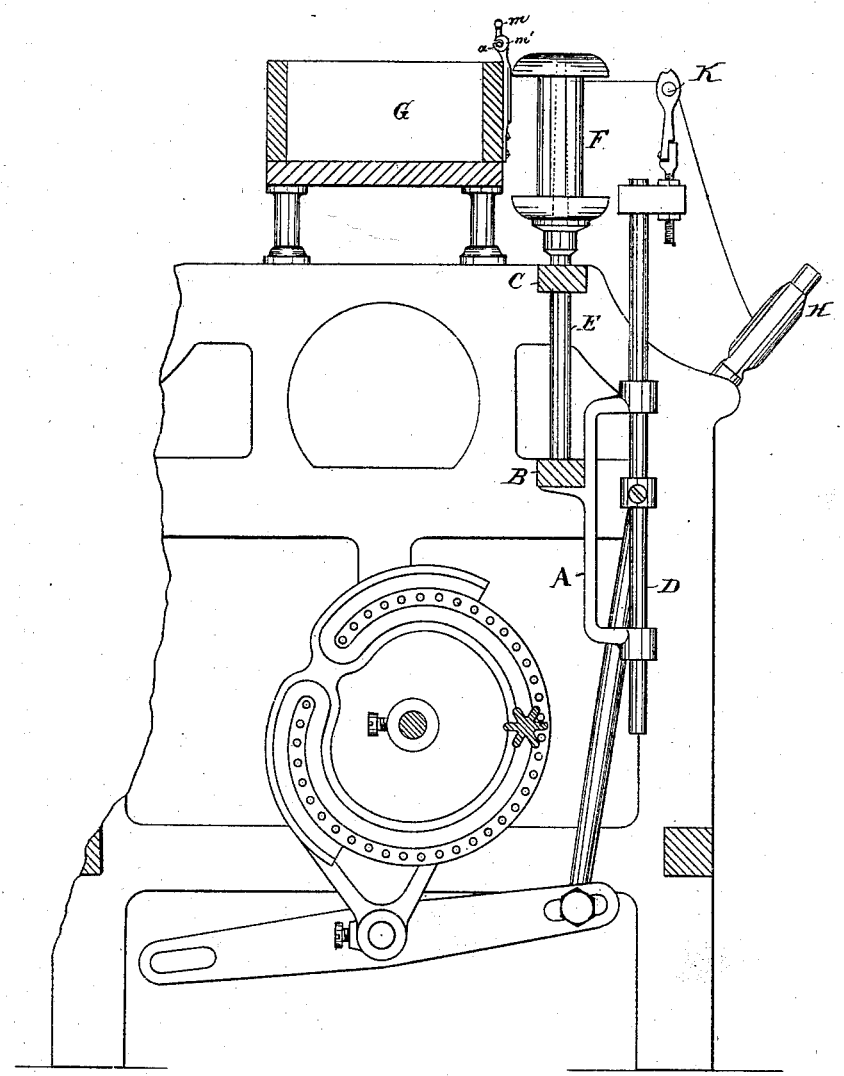

(No Model.) 2 Sheets—Sheet 1.
H. P. CHASE.
KNOT TYING APPARATUS FOR SPOOLING MACHINES.

No. 268,622. Patented Dec. 5, 1882.

Witnesses.
Fred A. Powell
John F. C. Prinkirk

Inventor.
Horace P. Chase
by Crosby & Gregory
atty's (No Model.) 2 Sheets—Sheet 2.
H. P. CHASE.
KNOT TYING APPARATUS FOR SPOOLING MACHINES.
No. 268,622. Patented Dec. 5, 1882.
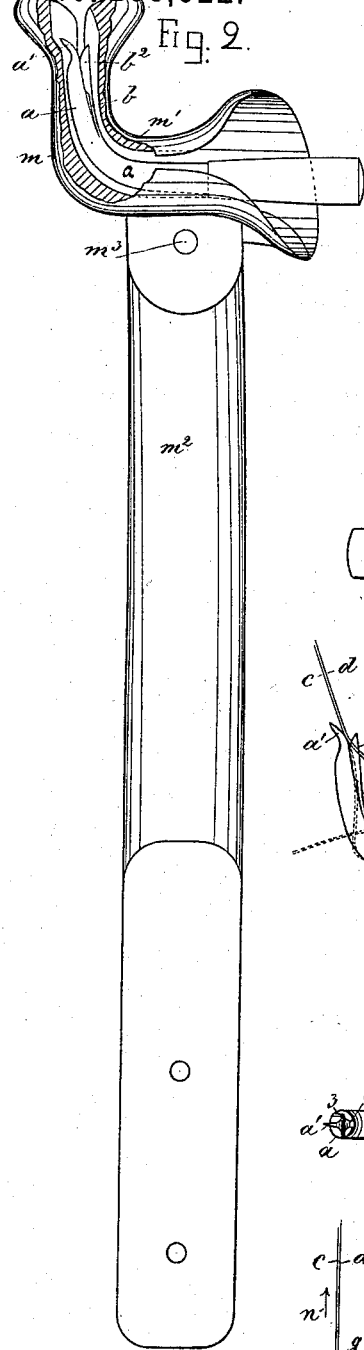
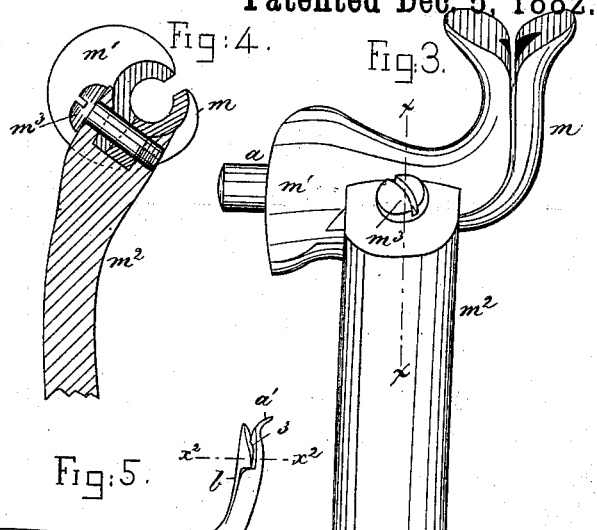
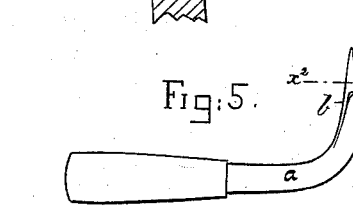
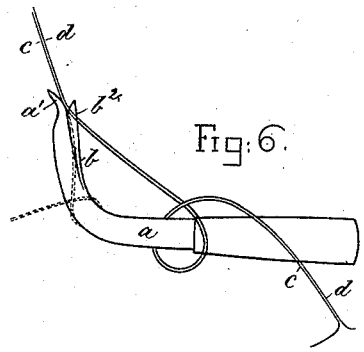
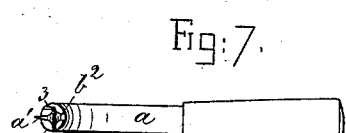
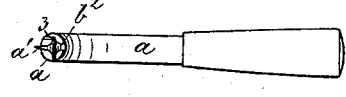
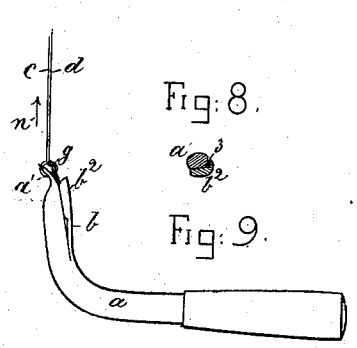
Witnesses.
Fred A. Powell
John F. C. Prinkert
Inventor.
Horace P. Chase
by Crosby & Gregory
Attys.

UNITED STATES PATENT OFFICE.

HORACE P. CHASE, OF LOWELL, ASSIGNOR OF ONE-HALF TO GEORGE DRAPER & SONS, OF HOPEDALE, MASSACHUSETTS.

KNOT-TYING APPARATUS FOR SPOOLING-MACHINES.

SPECIFICATION forming part of Letters Patent No. 268,622, dated December 5, 1882.

Application filed July 5, 1882. (No model.)

*To all whom it may concern:*

Be it known that I, HORACE P. CHASE, of Lowell, county of Middlesex, State of Massachusetts, have invented an Improvement in Knot-Tying Apparatus for Spooling-Machines, of which the following description in connection with the accompanying drawings is a specification.

This invention has for its object the production of a simple and efficient apparatus by which to rapidly tie together the ends of two pieces of thread, forming a knot called the "overhand" knot.

In this invention the support for the knot-tying apparatus is shown as attached to the spool-box of a spooling-machine, it being understood that in practice there would be a knot-tying device to co-operate with each spindle. The knot-tying device is composed of a metal rod, preferably curved as shown in the drawings, and having its delivery end shaped or constructed to firmly hold two threads while they are being tied together. The forked end of the knot-tying device is provided with a cutter to cut off the two threads just beyond the point where they are clamped together and held by the said forked end, and preferably the extremity of the delivery end of the device is drawn out or reduced to a small point, over which the tied knot passes, the said point insuring the formation of the knot close to the ends of the threads, and to that part of the tying device holding the two threads. The knot-tying device is placed loosely in a holder so that its two ends are left free.

My invention consists in a knot-tying device having a prong at its delivery end and forked to clamp and hold the two ends of the thread wrapped about its shank and provided with a cutter to cut off the threads close to the part of the device which clamps and holds the thread while the knot is being formed by drawing the thread from the shank of the knot-tying device off its delivery end.

My invention also consists in other features relating to knot-tying devices, as described in this specification, and as will be specifically pointed out in the claims.

Figure 1 represents in partial vertical section a sufficient portion of a spooling-machine to illustrate my invention, one of my knot-tying devices being attached thereto. Fig 2 is an enlarged side view of one of my knot-tying devices with its holder, the latter being partially broken out; Fig. 3, an opposite view of Fig. 2; Fig. 4, a section of Fig. 3 on the dotted line $x\,x$. Fig. 5 is an elevation of that side of the knot-tying device which is provided with the thread-cutter; Fig. 6, an opposite side elevation of the knot-tying device with thread thereon, showing two different stages of the operations of tying a knot in two threads; Fig. 7, a top view of Fig. 5, the thread being omitted; Fig. 8, a section of Fig. 5 on the dotted line $x^2\,x^2$; and Fig. 9 is a side elevation of the knot-tying device, showing the knot tied in the two threads, the knot being in the act of slipping from the point of the knot-tying device, the free ends of the threads being held between the forked or clamp-like ends of the said device.

The spooling-machine herein selected upon which to show my invention applied in working position is substantially such as referred to in United States Patent No. 193,106 granted to W. Bancroft July 17, 1877, with the usual spool-box, such as shown in United States Patent No. 168,066, added. The supporting-rod D is common to the Patent No. 193,106. The guide A, foot-step rail B, bolster-rail C, spindle E, spool F, and spool-box G are as now commonly employed.

The operation of spooling yarn consists in winding the yarn from spinning-bobbins upon large spools, which in turn are placed in the creel of the warper, and the yarn therefrom wound upon beams preparatory to dressing and weaving. From ten to twenty bobbins of yarn are wound upon each spool. The yarn to be wound upon the spools F is taken from bobbins H, placed on a spindle or in a holder such as described in United States Patent No. 245,677, placed in the position indicated by bobbin H in Fig. 1, all in usual manner. The spooler-tender is given as many spindles to attend as she can keep the yarn winding upon, she tying on a full bobbin as soon as the yarn is wound off from its predecessor. The number of spooler-spindles that she can attend and the amount of yarn that she can spool are therefore limited by the speed with which she can tie knots.

Ordinarily when the yarn on a bobbin is wound off the operator puts a fresh one on its spindle or in its holder, then with the left hand presses upon the top of the spool and stops its rotation by causing the driving-band to slip on the whirl of the spindle. Then with the right hand she takes the end of the thread connected with the bobbin, and the end of the thread connected with the spool, and brings them together at the spool-head, where with both hands she ties the knot, then with the right hand places the thread in the guide K, and, releasing the spool with the left hand, the winding commences. She then replaces the next empty bobbin in the same way, and so on. The tying of this knot requires numerous motions, and the circumstances under which it is tied make it very common to leave long free ends outside the knot. These ends in subsequent operations, especially in weaving, are productive of a great deal of trouble to the weaver and imperfection in the cloth—more trouble and imperfection probably than from any other one cause. All cotton goods are now examined after weaving to remove these projecting ends. By this invention these long projecting ends are prevented entirely, and as the knots can be tied much quicker the cost of spooling is reduced. The knot-tying device is composed of a piece of metal, (see Figs. 5 and 6,) the shank $a$ of which will preferably be shaped as therein shown. The upper part of this piece of metal is notched and shaped as shown in the drawings, and its upper end is herein shown as provided with a curved point, $a'$, from the end of which the knot formed in the thread is drawn, enabling the knot to be tied very close to the upper end of the said device, as shown in Fig. 9.

The part $b$ of the knot-tying device is made as a separate piece suitably fastened to the main part thereof, leaving the enlarged upper end or head, $b^2$, of the part $b$ shaped substantially as shown in the drawings, the head being supported by the narrow part $b$ where it joins part $a$, that the upper broad part of $b$ may yield a little, it and the upper part of portion $a$ forming a fork or clamp, which clamp will hold the free ends of the two threads $c$ and $d$ when the said threads are drawn between them by the operator. The edge of the broad portion or head $b^2$ of part $b$ farthest from the operator is sharpened or beveled to make an edge sufficiently sharp to form a cutter, as at 3, Fig. 5, to sever the two threads $c\ d$ close to, but just beyond, the point where they are clamped and held firmly by the parts $a\ b^2$, thus cutting off the free ends of the two threads close to the knot-tying device. The two threads to be tied together—the one $c$, being supposed to be connected with the spool, and the one $d$, with the bobbin—will be laid together or in contact with each other near and back from their ends, and to tie the said threads together they will be wrapped together about the shank $a$ of the tying device, as shown by the full lines, Fig. 6, and the threads placed in the notch between parts $a\ b^2$, as shown, will both be drawn together into the irregular slot or space between the parts $a\ b^2$. When drawn down between the said parts for a short distance, the two threads will be firmly clamped between the parts $a\ b^2$, and both threads, as they meet and are drawn down over and along the edge of the cutter or cutting portion 3, are cut off. Then the operator, with the right hand, while the left hand rests on the spool F, seizes the two threads between the body of the tying device and the spool and lifts them, causing the coil of thread on the shank to be drawn or moved upward thereon, as in dotted lines, Fig. 6, the two ends of the thread yet being firmly held or clamped between parts $a\ b^2$, as shown in Fig. 9; and, finally, by the continued upward drawing of the said threads in the direction of arrow $n$, Fig. 9, they are drawn gradually from between the said parts $a\ b^2$, the said threads passing off as a knot, as shown at $g$, Fig. 9, and finally escaping from the point $a'$, the ends of the threads $c\ d$, the knot $g$ having been formed as described, being drawn from between the clamping-surfaces of $a\ b^2$ by a sufficiently hard pull thereon by the operator, leaving the two threads tied firmly together close to the ends, forming a piecing which will not cause trouble in weaving or leave an end to be trimmed from the woven cloth.

The spool being held by the left hand while the knot is being tied, makes it desirable that the yarn should be wound around the shank end of the tying device with the right hand. As a holder for the knot-tyer firmly fastened thereto would stop the thread in its passing along the shank to its working end, I have devised a holder composed of two metal or other stiff shells, $m\ m'$, shaped as shown, each having an ear, which ears are placed side by side and inserted in a notch of the standard or support $m^2$ where they are held by a screw $m^3$. The enlarged part of the shank of the tying device prevents the same from being drawn too far into the holder, and the pull upon the said tying device always being upward, there is no tendency of said device to escape from its holder; but any such tendency would be resisted by the curvature of the shank $a$ fitting in between the shell $m\ m'$. The slot between the two parts $m\ m'$ of the holder directs the threads readily into the space between the upper portions of the parts $a\ b^2$. (See Fig. 2.)

By employing the prong $a'$ and curving it as shown in Fig. 5, so as to make a sort of a hook, the loop formed in the thread is prevented from rising rapidly from the delivery end of the tying device, and the formation of the knot is carried closer to the end of the tying device than were the said point $a'$ omitted, which might be the case.

Fig. 8 shows clearly the flat surface of $a$ and $b^2$, which, co-operating, form the clamping surfaces or jaws to hold the ends of the threads at the left of the cutter or edge 3.

The knot-tying device may be held by hand and be operative to tie a knot, and the holder may be changed in shape without departing from my invention.

I claim—

1. The knot-tying device composed of the body $a$ and attached head or part $b^2$, combined with holding-shells $m$ $m'$, to operate substantially as described.

2. The combination, with the body $a$ of the knot-tying device and its attached head or part $b^2$, provided with a cutter or edge, 3, of holding-shells $m$ $m'$, provided with a thread-guiding slot, to operate substantially as described.

3. The combination, with the body $a$ of the knot-tying device, provided with the prong $a'$, of the head or portion $b^2$, provided with the cutter or edge 3, and the holding-shells $m$ $m'$, all operating substantially as described.

4. The knot-tying device $a$, having the head $b^2$, and cutter or edge 3 to clamp and cut the thread, combined with the shells $m$ $m'$, to inclose and support the tying device, substantially as described.

5. The combination, with the frame of a spooling-machine, spool-box, and spindle E to rotate the spool F, of a knot-tying device, having thread-clamping surfaces and a cutter or edge, 3, to sever the threads, and means to support the knot-tying device, to operate substantially as described.

6. The combination, with the frame, spool-box, spool-spindle, and bobbin-holder of a spooling-machine, of mechanism for tying knots in or piecing the yarns applied in conjunction with such spool-spindle, substantially as shown and described.

7. The body $a$ of the knot-tying device provided with the prong $a'$, combined with the head or portion $b^2$, provided with the cutter or edge 3, whereby the two threads to be tied together are held while their free ends are looped about the body of the tying device, and drawn off its prong to form a knot, and the ends of the thread are severed close to the knot when the latter is drawn from the said prong, substantially as described.

In testimony whereof I have signed my name to this specification in the presence of two subscribing witnesses.

HORACE P. CHASE.

Witnesses:
ALBERT M. MOORE,
ELIAS G. WATSON.